United States Patent Office 3,734,941
Patented May 22, 1973

3,734,941
PROCESS FOR CONVERTING URETHANES
TO ISOCYANATES
Walter Joseph Sydor, Raritan, N.J., assignor to American
Cyanamid Company, Stamford, Conn.
No Drawing. Filed Sept. 6, 1968, Ser. No. 758,138
Int. Cl. C07c 119/04
U.S. Cl. 260—453 P                                    4 Claims

ABSTRACT OF THE DISCLOSURE

A process for producing isocyanates from urethanes which comprises heating a urethane of the formula:

$$R(NHCOOR')_x$$

wherein R is alkyl of from 1 to 18 carbon atoms, aryl or alkaryl containing less than 3 rings, R' is alkyl of 1 to 6 carbon atoms, aryl or alkaryl of less than three rings, and $x$ is 1, 2 or 3, at a temperature between 400° C. and 600° C. in the presence of a Lewis acid to form vapors and condensing the vapors to recover an organic isocyanate.

---

This invention relates to a process for preparing organic isocyanates. More particularly, this invention relates to a process for preparing organic isocyanates from urethanes by catalytic pyrolysis.

At the present time, large amounts of organic isocyanates are commercially produced, a large proportion being used for the production of high molecular weight polyurethanes. For example, the organic isocyanates can be reacted with an hydroxy-terminated polymer to produce an isocyanate-terminated polymer which is then reacted with an organic diamine or glycol to produce the high molecular weight polyurethane. This end-use alone consumes isocyanates at the rate of about 100 million pounds annually and the rate is constantly increasing.

The most common commercial process for producing organic isocyanates involves the reaction of phosgene with an amino compound corresponding to the desired isocyanate. The reaction is carried out at elevated temperatures. Due to the extreme toxicity of phosgene gas, great care must be taken during reaction to ensure that neither the reactants nor the product escape into the atmosphere.

Another known process for producing organic isocyanates involves the non-catalytic pyrolysis of urethanes to the corresponding isocyanate and alcohol. This reaction is reversible and temperature-dependent. The urethane is converted to the isocyanate and the alcohol at temperatures above about 250° C. However, the yield of isocyanate by this process is undesirably low. At lower temperatures, the isocyanate and the alcohol will readily react to reform the original urethane. Thus, while this process is attractive from the standpoint of employing relatively non-toxic starting materials, there are drawbacks in that relatively low yields of isocyanates are obtained thereby. There is, therefore, a present need to provide a process for producing organic isocyanates whereby relatively non-toxic starting materials are employed and the organic isocyanate is obtained in relatively high yields.

At the present time there is also a need for a process for producing organic isocyanates from relatively inexpensive starting materials. It has been proposed to produce organic isocyanates directly from organo nitro compounds and carbon monoxide in the presence of a catalyst. While this process is eminently suitable for the production of mono-isocyanates, it is difficult to obtain di-isocyanates in sufficiently high yields to make the process commercially attractive. This is especially important since the di-isocyanates of all isocyanates, are the most valuable from a commercial standpoint. However, it is known that urethanes, including bis-urethanes, can be produced in high yields by reacting an organo nitro compound, an alcohol, and carbon monoxide in the presence of a palladium-Lewis acid catalyst. This process is preferable to other processes which employ an isocyanate as a starting material to produce urethanes, since the isocyanate is more expensive than the organo nitro compound and the alcohol. Thus, it would be highly desirable to provide a process for converting urethanes, especially bis-urethanes, to isocyanates, including di-isocyanates from inexpensive organo nitro compounds and alcohols.

Accordingly, it is an object of the present invention to provide a process by which isocyanates can be produced from relatively non-toxic materials. It is a further object of the present invention to provide a process for producing isocyanates from urethanes in relatively high yields. Further objects of the present invention will become evident from the following detailed description.

In accordance with the present invention, a urethane is heated in the presence of a Lewis acid catalyst to effect the decomposition thereof to an organic isocyanate and an alcohol. The reaction is represented by Equation I:

$$\underset{(I)}{R(NHCOOR')_x} \rightleftarrows \underset{(II)}{R(NCO)_x} + \underset{(III)}{R'OH}$$
Equation I In the above equation, R is alkyl from 1 to 8 carbon atoms, or aryl preferably containing less than three six-membered rings, R' is alkyl from 1 to 6 carbon atoms, aryl or alkaryl of less than three rings, and $x$ is 1, 2 or 3. Each of the alkyl or aryl radicals can contain additional substituents such as halogen, acylamido, isocyanato, hydroxy, mercapto, carboxy, cyano, alkoxy, acyl, sulfonyl, sulfamoyl, phosphono, phosphino, and silyl radicals.

As shown by the above equation, the decomposition of the urethane to the corresponding isocyanate and alcohol is reversible. To drive the reaction toward the production of isocyanate, the catalytic pyrolysis is carried out at elevated temperatures in the range of from about 400° C. to about 600° C., preferably from about 450° C. to about 500° C., and preferably at sub-atmospheric pressure. Under these conditions, the isocyanate and the alcohol are produced in high yields. In order to prevent or minimize the re-combination of the isocyanate and the alcohol to produce the starting urethane material, a high temperature is maintained and the effluent vapors are removed from the reaction vessel under controlled temperature conditions. The vapors are then subjected to partial condensation in order to separate the isocyanate and the alcohol products. It has been found that by employing a Lewis acid catalyst greatly improved yields of the isocyanate product are obtained as compared to a process wherein the urethane is subjected to non-catalytic pyrolysis. Thus, the present invention provides a process for producing isocyanates whereby substantially non-toxic starting materials are employed and the isocyanate is obtained in high yields.

Suitable urethanes which can be employed as starting materials are those represented by Formula I above, and the method employed to make these urethanes is not critical to the present invention. The starting urethane can be either a mono-urethane, a bis-urethane or a tris-urethane. When the starting material is a bis-urethane or tris-urethane, each R' can be the same or different. When the R' groups are different, more than one alcohol is obtained in the pyrolysis product.

While the process of the present invention is not dependent upon a method of making the urethane, it is preferred to employ the present invention in conjunction with a process for making urethanes from an organic nitro compound, an hydroxyl compound and carbon monoxide. This is because the combination of the method of making uurethanes and the method of making isocyanates makes it now possible to produce organic diisocyanates in relatively high yields from inexpensive starting materials. Further more, the alcohol by-product obtained from the urethane pyrolysis step can be recycled for reaction with the organic nitro compound to produce the urethane starting material. The production of the urethane is effected in the presence of a mixture of a Lewis acid and a noble metal such as platinum, palladium, ruthenium, rhodium, osmium or iridium. The reaction is carried out at a pressure in the range of 40 p.s.i. to 100,000 p.s.i. and at a temperature above 60° C. and preferably between 150° C. and the temperature of decomposition of either the starting material or products. Suitable organic nitro starting materials include o-, m- and p-dinitrobenzenes, dinitrotoluenes and isomeric mixtures thereof. Suitable hydroxy compounds include methanol, ethanol, propanol, isopropanol, phenol, cresols, naphthols, and the like. It is desirable, but not necessary, that a solvent be employed, since many nitro compounds are solids under the reaction conditions. Suitable solvents are anhydrous liquids in which the nitro compound is soluble or dispersible, e.g., benzene, toluene, xylene, aliphatic halogenated hydrocarbons, halogenated aromatic hydrocarbons, and the like. It is important that the solvent, as well as the other materials charged into the reactor, be anhydrous, since the desired product is not obtained in high yields in the presence of water. An excess of hydroxyl-containing compound may be used as the solvent when it is a liquid.

In producing the urethanes, the amount of carbon monoxide pumped into the reactor should be sufficient to provide at least 3 moles of carbon monoxide per nitro group. Preferably, however, a large excess should be employed to give the super-atmospheric pressures needed for preferred operation in the production of urethanes.

Representative suitable urethanes include:

ethyl phenylcarbamate,
butyl phenylcarbamate,
pentyl phenylcarbamate,
hexyl phenylcarbamate,
ethyl 1-naphthylcarbamate,
ethyl 9-anthrylcarbamate,
ethyl 4-biphenylylcarbamate,
diethyl m-phenylenedicarbamate,
diethyl 1,5-naphthylenedicarbamate,
methyl isopropylcarbamate,
ethyl methoxymethylcarbamate,
methyl sec.-butylcarbamate,
ethyl 3-chloropropylcarbamate,
methyl tert.-butylcarbamate,
diethyl tetramethylenedicarbamate,
ethyl 1-ethylcyclohexylcarbamate,
propyl tert.-octylcarbamate,
methyl p-tolylcarbamate,
ethyl 4-trifluoromethylphenylcarbamate, isopropyl 3-chlorophenylcarbamate,
ethyl 2-methyl-5-nitrophenylcarbamate,
ethyl 4-methyl-3-nitrophenylcarbamate,
diethyl 4,4'-methylenediphenylcarbamate,
dimethyl m-phenylenedicarbamate,
diethyl 2,4-tolylenedicarbamate,
diethyl 2,6-tolylenedicarbamate,
diethyl 4-chloro-m-phenylenedicarbamate,
methyl p-butoxyphenylcarbamate,
ethyl p-acetylphenylcarbamate,
ethyl p-bromophenylcarbamate,
ethyl o-nitrophenylcarbamate,
isopropyl m-trifluoromethylphenylcarbamate,
triethyl 1,3,5-benzenetricarbamate, and the like The catalyst for the reaction of this invention comprises a Lewis acid as defined in "Physical Organic Chemistry," Hine, 1962, McGraw-Hill Book Co., New York. According to the reference, Bronsted acids are included by the term "Lewis acids," The Lewis acid component of the catalyst can be a halide, acetate, sulfate or phosphate of a metal such as tin, titanium, gallium, iron, aluminum or copper.

As specific examples of Lewis acids, one can name ferric chloride, ferrous chloride, stannic chloride, stannous chloride, aluminum chloride, titanium tetrachloride, aluminum bromide, gallium trichloride and cuprous chloride. Additional examples of the salt type of Lewis acids are listed in "Friedel-Crafts and Related Reactions," George A. Olah, Volume I, 1963, Int. Publ., N.Y. Bronsted acids may be used providing they do not chemically convert the desired end product.

Within the group of useful Lewis acids, it is preferred to use strong Lewis acids having a halide anion. Chlorides of iron are especially preferred.

It has been found that a useful range of Lewis acid concentration is between about 0.01 and 10%, preferably between about 0.5 to 3.0% by weight based upon the weight of urethane. The upper limit of catalyst usage is governed primarily by cost considerations. Within these areas, the centers of the respective ranges are especially preferred, but this preferred range depends on the equipment and conditions used, i.e., the amount of agitation, concentrations, temperature, pressure, etc.

The reaction is advantageously carried out in a pyrolyzer equipped with means for passing the vapors therefrom to condensing means. It is preferred to employ a plurality of condensers connected in series in order to effect substantial separation of the alcoholic product or products from the isocyanate product. As the isocyanate product usually has a higher boiling point than the alcohol product, it is collected in the first condenser. The temperature maintained in the condensers, of course, will depend upon the boiling points of the products obtained. When bis-urethanes are employed as starting materials, the product will be a mixture of mono- and di-isocyanates. The di-isocyanate can be recovered from the monoisocyanate by any well-known means such as by fractional distillation and the mono-isocyanates can be recycled to the pyrolyzer. Similarly di-isocyanates and tri-isocyanates are obtained when employing tris-urethanes. In any event, the condensation temperatures are maintained so as to effect the desired separation of alcohol from unreacted starting materials and isocyanate product.

The following examples illustrate the present invention and are not intended to limit the same.

EXAMPLE 1

In Runs 1 and 2 of Table I, molten diethyl 2,4-tolylenedicarbamate was added slowly to a heated vaporizer and the resulting vapors were passed through a pyrolyzer maintained at a uniform high temperature. The process temperatures for each run were varied as set forth in Table I. The resulting gases were passed through a condenser kept at 25° C. and then through a second condenser kept at −50° C. or below. The entire operation was carried out under a vacuum equivalent to about 29 inches of mercury. 2,4-tolylene diisocyanate, the monoisocyanates, ethyl 2-methyl-5-isocyanatophenylcarbamate, and ethyl 4-methyl-3-isocyanatophenylcarbamate, as well as unreacted bis-urethane were condensed and collected in the first condenser and receiver. Ethanol was condensed and collected in the second condenser and receiver. The material in the first receiver was analyzed for total NCO content, for 2,4-tolylene diisocyanate (TDI) and for ethyl methylisocyanatophenylcarbamate.

In Runs 3 and 4 of Table I, anhydrous ferric chloride was mixed with the 2,4-tolylenedicarbamate before it was melted. The procedure set forth for Runs 1 and 2 was then followed.

In Table I are shown the amount of diethyl 2,4-tolylenedicarbamate used, the amount of ferric chloride added (weight and percent based on the dicarbamate), the elapsed time for adding the dicarbamate to the vaporizer, the temperature of the vaporizer, the temperature of the pyrolyzer, the weight of the residue in the vaporizer, the weight of the ethanol collected in the second receiver, the weight of the isocyanate and other materials collected in the first receiver, and the percent total NCO, percent 2,4-tolyene diisocyanate and percent ethyl methyl-isocyanatophenylcarbamates in the material collected in the first receiver. The percents of NCO, TDI and monoisocyanate in Table I are based upon isocyanate by weight. The yield of NCO per 100 g. of dicarbamate is also shown in Table I.

TABLE I

| Run | 1 | 2 | 3 | 4 |
|---|---|---|---|---|
| Feed mixture: | | | | |
| Urethane, grams | 9.0 | 5.8 | 10.4 | 11.8 |
| Ferric chloride, grams | 0 | 0 | 0.1 | 0.1 |
| Ferric chloride, percent | 0 | 0 | 0.95 | 0.84 |
| Addition time, minutes | 31 | 65 | 16 | 52 |
| Temperature of vaporizer, °C | 290 | 365 | 260 | 265 |
| Temperature of pyrolyzer, °C | 465 | 495 | 465 | 475 |
| Residue, grams | 0 | 0 | 0.3 | 0.5 |
| Ethanol, grams | 0.6 | | 2.9 | 2.7 |
| Isocyanate, grams | 6.8 | 6.4 | 7.0 | 7.1 |
| NCO, percent | 3.5 | 4.0 | 31.9 | 29.3 |
| TDI, percent | 0.9 | 1.7 | 57.8 | |
| Monoisocyanate, percent | 16.1 | 16.7 | 21.0 | |
| Yield NCO, grams/100 grams dicarbamate | 2.65 | 1.85 | 21.4 | 17.1 |

This example demonstrates the effectiveness of ferric chloride as a catalyst for the conversion of urethanes to isocyanates by pyrolysis.

EXAMPLE 2

When the procedure of Example 1, Run 3, is followed substituting an equivalent amount of ethyl butylcarbamate for the diethyl 2,4-tolylenedicarbamate, butyl isocyanate is obtained in good yield.

EXAMPLE 3

When the procedure of Example 1, Run 3, is followed substituting an equivalent amount of phenyl 3-methoxypropylcarbamate for the diethyl 2,4-tolylenedicarbamate, 3-methoxypropyl isocyanate is obtained.

EXAMPLE 4

When the procedure of Example 1, Run 3, is followed substituting an equivalent amount of ethyl p-chlorobenzylcarbamate for the diethyl 2,4-tolylenedicarbamate, p-chlorobenzyl isocyanate is obtained.

EXAMPLE 5

When the procedure of Example 1, Run 3, is followed substituting an equivalent amount of ethyl m-methylthiophenylcarbamate for the diethyl 2,4-tolylenedicarbamate, m-methylthiophenyl isocyanate is obtained.

I claim:
1. In a process of producing isocyanates from urethanes by pyrolysis, the improvement which comprises heating a urethane of the formula:

$$R(NHCOOR')_x$$

wherein R is alkyl from 1 to 8 carbon atoms, aryl or alkaryl containing less than 3 rings, R' is alkyl of 1 to 6 carbon atoms or phenyl, and $x$ is 1, 2 or 3, at a temperature between 400° C. to 600° C. in the presence of a catalytic amount of a member selected from the group consisting of ferric chloride, ferrous chloride, stannic chloride, stannous chloride, aluminum chloride, titanium tetrachloride, aluminum bromide, gallium trichloride and cuprous chloride to form vapors and condensing the vapors to recover an organic isocyanate.

2. The process of claim 1 wherein the urethane is a tolylenedicarbamate.

3. The process of claim 1 wherein the urethane is a bis-urethane.

4. The process of claim 1 wherein the urethane is a mono-urethane.

References Cited

UNITED STATES PATENTS 2,409,712  10/1946  Schweitzer _____ 260—453
2,713,591  7/1955  Bortnick _____ 260—453

FOREIGN PATENTS 993,704  6/1965  Great Britain.

OTHER REFERENCES

Royals: Advanced Organic Chemistry, Prentice-Hall, Inc., (New Jersey), 1954 pp. 235–6 and 873.

LEWIS GOTTS, Primary Examiner

D. H. TORRENCE, Assistant Examiner

U.S. Cl. X.R.

260—453 PC